(12) United States Patent
Svensson

(10) Patent No.: US 7,788,386 B2
(45) Date of Patent: Aug. 31, 2010

(54) SYSTEM AND METHOD FOR SHAPING TRAFFIC

(75) Inventor: Jan Thomas Svensson, Oakland, CA (US)

(73) Assignee: BEA Systems, Inc., Redwood Shores, CA (US)

(*) Notice: Subject to any disclaimer, the term of this patent is extended or adjusted under 35 U.S.C. 154(b) by 567 days.

(21) Appl. No.: 11/432,934

(22) Filed: May 12, 2006

(65) Prior Publication Data

US 2007/0104208 A1    May 10, 2007

Related U.S. Application Data

(60) Provisional application No. 60/733,823, filed on Nov. 4, 2005.

(51) Int. Cl.
| | |
|---|---|
| G06F 15/16 | (2006.01) |
| H04L 12/26 | (2006.01) |
| H04L 12/56 | (2006.01) |
| H04L 12/28 | (2006.01) |

(52) U.S. Cl. ............ 709/229; 370/230; 370/232; 370/395.42; 370/401

(58) Field of Classification Search .......... 709/226, 709/227–229; 370/230, 395, 401
See application file for complete search history.

(56) References Cited

U.S. PATENT DOCUMENTS

| | | | |
|---|---|---|---|
| 5,440,727 A | 8/1995 | Bhide et al. | |
| 5,659,596 A | 8/1997 | Dunn | |
| 6,052,724 A | 4/2000 | Willie et al. | |
| 6,067,301 A * | 5/2000 | Aatresh | 370/418 |
| 6,134,673 A | 10/2000 | Chrabaszcz | |
| 6,208,870 B1 | 3/2001 | Lorello et al. | |
| 6,279,076 B1 | 8/2001 | Shishido et al. | |
| 6,292,833 B1 | 9/2001 | Liao et al. | |
| 6,480,862 B1 | 11/2002 | Gall | |
| 6,578,076 B1 | 6/2003 | Putzolu | |
| 6,611,867 B1 | 8/2003 | Bowman-Amuah | |
| 6,621,793 B2 | 9/2003 | Widegren et al. | |
| 6,625,751 B1 | 9/2003 | Starovic et al. | |
| 6,629,260 B1 | 9/2003 | Dancer et al. | |
| 6,704,933 B1 | 3/2004 | Tanaka et al. | |
| 6,708,206 B1 | 3/2004 | Thrane et al. | |
| 6,721,286 B1 | 4/2004 | Williams et al. | |
| 6,747,970 B1 | 6/2004 | Lamb et al. | |
| 6,823,477 B1 | 11/2004 | Cheng et al. | |
| 6,862,689 B2 | 3/2005 | Bergsten et al. | |

(Continued)

OTHER PUBLICATIONS

Wei Zhuang, Yung Sze Gan, Kok Jeng Loh, and Kee Chaing Chua, Siemens Private Limited, IEEE Network, May/Jun. 2003 pp. 51-52.*

(Continued)

*Primary Examiner*—Joseph E Avellino
*Assistant Examiner*—Thai N Nguyen
(74) *Attorney, Agent, or Firm*—Fliesler Meyer LLP

(57) ABSTRACT

In accordance with embodiments, there are provided mechanisms and methods for shaping traffic. These mechanisms and methods for shaping traffic can enable embodiments to control traffic flow at a network gatekeeper based upon policies implementing service level agreements dictating traffic characteristics permitted to applications and/or by network node. The ability of embodiments to provide service level agreement based control of network traffic can enable control of traffic flow by application and/or by network node.

15 Claims, 7 Drawing Sheets

U.S. PATENT DOCUMENTS

| | | |
|---|---|---|
| 6,965,777 B1 | 11/2005 | Cast et al. |
| 6,988,133 B1 | 1/2006 | Zavalkovsky et al. |
| 7,039,037 B2 | 5/2006 | Wang et al. |
| 7,050,424 B2 | 5/2006 | Cheng et al. |
| 7,058,046 B2 | 6/2006 | Celi et al. |
| 7,076,562 B2 | 7/2006 | Singhal et al. |
| 7,082,102 B1 | 7/2006 | Wright |
| 7,089,307 B2 | 8/2006 | Zintel et al. |
| 7,142,876 B2 | 11/2006 | Trossen et al. |
| 7,283,539 B2 | 10/2007 | Wang et al. |
| 7,301,905 B1 * | 11/2007 | Tontiruttananon et al. ... 370/232 |
| 7,380,073 B2 | 5/2008 | Shorb |
| 7,392,421 B1 | 6/2008 | Bloomstein et al. |
| 7,464,178 B2 | 12/2008 | Corrigan et al. |
| 7,506,194 B2 | 3/2009 | Appanna et al. |
| 2001/0030970 A1 | 10/2001 | Wiryaman et al. |
| 2002/0036983 A1 | 3/2002 | Widegren et al. |
| 2002/0039352 A1 * | 4/2002 | El-Fekih et al. ............. 370/252 |
| 2002/0073404 A1 | 6/2002 | Sokolov et al. |
| 2002/0075844 A1 | 6/2002 | Hagen |
| 2002/0077134 A1 | 6/2002 | Mizell et al. |
| 2002/0129174 A1 | 9/2002 | LaBaw |
| 2002/0144119 A1 | 10/2002 | Benantar |
| 2002/0159387 A1 * | 10/2002 | Allison et al. ............... 370/229 |
| 2003/0033524 A1 | 2/2003 | Tran et al. |
| 2003/0055920 A1 | 3/2003 | Kakadia et al. |
| 2003/0093695 A1 | 5/2003 | Dutta |
| 2003/0095540 A1 | 5/2003 | Mulligan et al. |
| 2003/0120593 A1 | 6/2003 | Bansal et al. |
| 2003/0125021 A1 | 7/2003 | Tell et al. |
| 2003/0131116 A1 | 7/2003 | Jain et al. |
| 2003/0158908 A1 | 8/2003 | Jacobs et al. |
| 2003/0227926 A1 * | 12/2003 | Ramamurthy et al. .. 370/395.42 |
| 2004/0002881 A1 | 1/2004 | Hu et al. |
| 2004/0116117 A1 | 6/2004 | Ahvonen et al. |
| 2004/0117794 A1 * | 6/2004 | Kundu ........................ 718/102 |
| 2004/0139204 A1 | 7/2004 | Ergezinger et al. |
| 2004/0148357 A1 | 7/2004 | Corrigan et al. |
| 2004/0160911 A1 | 8/2004 | Zilliacus et al. |
| 2004/0168162 A1 | 8/2004 | Park et al. |
| 2004/0196858 A1 | 10/2004 | Tsai et al. |
| 2004/0213156 A1 * | 10/2004 | Smallwood et al. ......... 370/232 |
| 2004/0223602 A1 | 11/2004 | Honkasalo et al. |
| 2004/0258238 A1 | 12/2004 | Wong |
| 2004/0260967 A1 | 12/2004 | Guha et al. |
| 2004/0267882 A1 | 12/2004 | Whynot et al. |
| 2004/0267883 A1 | 12/2004 | Whynot et al. |
| 2005/0005022 A1 | 1/2005 | Taylor |
| 2005/0022047 A1 | 1/2005 | Chandrasekaran |
| 2005/0022210 A1 | 1/2005 | Zintel et al. |
| 2005/0025050 A1 * | 2/2005 | Roeder ....................... 370/230 |
| 2005/0117576 A1 | 6/2005 | McDysan et al. |
| 2005/0152336 A1 | 7/2005 | Bratt et al. |
| 2005/0185661 A1 | 8/2005 | Scott et al. |
| 2005/0203962 A1 | 9/2005 | Zhou et al. |
| 2005/0203994 A1 | 9/2005 | Palmer et al. |
| 2005/0207432 A1 | 9/2005 | Velez-Rivera et al. |
| 2005/0237999 A1 | 10/2005 | Shores et al. |
| 2005/0259806 A1 | 11/2005 | Chang |
| 2005/0265276 A1 | 12/2005 | Takeda et al. |
| 2006/0002333 A1 | 1/2006 | Skog et al. |
| 2006/0010224 A1 | 1/2006 | Sekar et al. |
| 2006/0109818 A1 | 5/2006 | Ramanna et al. |
| 2006/0128409 A1 | 6/2006 | Gress et al. |
| 2006/0174271 A1 | 8/2006 | Chen et al. |
| 2006/0225108 A1 | 10/2006 | Tabassi et al. |
| 2007/0005766 A1 | 1/2007 | Singhal et al. |
| 2007/0011617 A1 | 1/2007 | Akagawa et al. |
| 2007/0195779 A1 | 8/2007 | Judge et al. |
| 2008/0021939 A1 | 1/2008 | Dahlstedt et al. |
| 2008/0126832 A1 | 5/2008 | Morosan et al. |
| 2008/0256257 A1 | 10/2008 | Miller et al. |

OTHER PUBLICATIONS

International Search Report and Written Opinion for PCT/US07/69021 dated Jul. 25, 2008, 10 pages.

International Search Report and Written Opinion for PCT/US06/11429 dated mailed Aug. 7, 2007, 6 pages.

International Search Report and Written Opinion for PCT/US06/11165 dated Oct. 22, 2007 (7 pages).

Zhuang, W. et al., Policy Based QoS Architecture in the IP Multimedia Subsystem of UMTS, IEEE Network, May/Jun. 2003, pp. 51-57.

Kristensen, A., "SIP Servlet API Version 1.0," Internet article [online], Feb. 4, 2003, http://jcp.org/en/jsr/detail?id=116> [retrieved on Mar. 6, 2009], p. 1—section 1, p. 4—section 1.4.2.

O'Doherty, P. et al., "SIP and the Java Platforms," Internet article [online], Jun. 2003, Sun Microsystems homepage, http://java.sun.com/products/jain/SIP-and-Java.html> [retrieved on Mar. 6, 2009], sections 1, 2.2, 4, 6.

BEA Systems, Inc., BEA WebLogic SIP Server: Configuring and Managing WebLogic SIP Server, Dec. 2, 2005, BEA Systems, Inc., Version 2.1, pp. 4-13.

* cited by examiner

SYSTEM AND METHOD FOR SHAPING TRAFFIC

CLAIM OF PRIORITY

The present application claims the benefit of U.S. Provisional Patent Application No. 60/733,823, entitled SYSTEM AND METHOD FOR A GATEKEEPER IN A COMMUNICATIONS NETWORK, by Reto Kramer, et al., filed on Nov. 4, 2005, which is incorporated herein by reference in its entirety.

CROSS REFERENCE TO RELATED APPLICATIONS

The following commonly owned, co-pending United States Patents and Patent Applications, including the present application, are related to each other. Each of the other patents/applications are incorporated by reference herein in their entirety:

U.S. patent application Ser. No. 11/378,188, entitled SYSTEM AND METHOD FOR MANAGING COMMUNICATIONS SESSIONS IN A NETWORK, by Reto Kramer, et al., filed on Mar. 17, 2006;

U.S. patent application Ser. No. 11/384,056, entitled SYSTEM AND METHOD FOR A GATEKEEPER IN A COMMUNICATIONS NETWORK, by Reto Kramer, et al., filed on Mar. 17, 2006;

U.S. Patent Application No. 60/800,949 entitled DIAMETER PROTOCOL AND SH INTERFACE SUPPORT FOR SIP SERVER ARCHITECTURE, by Anno Langen, et al., filed on May 17, 2006;

U.S. Patent Application No. 60/801,091 entitled SIP AND HTTP CONVERGENCE IN NETWORK COMPUTING ENVIRONMENTS, by Anno Langen, et al., filed on May 16, 2006;

U.S. Patent Application No. 60/800,943 entitled HITLESS APPLICATION UPGRADE FOR SIP SERVER ARCHITECTURE, by, Anno Langen et al. filed on May 16, 2006;

U.S. Patent Application No. 60/801,083 entitled ENGINE NEAR CACHE FOR REDUCING LATENCY IN A TELECOMMUNICATIONS ENVIRONMENT, by Anno Langen, et al. filed on May 16, 2006;

U.S. patent application Ser. No. 11/434,022 entitled SYSTEM AND METHOD FOR CONTROLLING DATA FLOW BASED UPON A TEMPORAL POLICY, by Narendra Vemula, et al., filed on May 15, 2006;

U.S. patent application Ser. No. 11/434,024 entitled SYSTEM AND METHOD FOR CONTROLLING ACCESS TO LEGACY PUSH PROTOCOLS BASED UPON A POLICY, by Bengt-Inge Jakobsson, et al., filed on May 15, 2006;

U.S. patent application Ser. No. 11/434,010 entitled SYSTEM AND METHOD FOR CONTROLLING ACCESS TO LEGACY MULTIMEDIA MESSAGE PROTOCOLS BASED UPON A POLICY, by Andreas Janson, filed on May 15, 2006; and U.S. patent application Ser. No. 11/434,025 entitled SYSTEM AND METHOD FOR CONTROLLING ACCESS TO LEGACY SHORT MESSAGE PEER-TO-PEER PROTOCOLS BASED UPON A POLICY, by Andreas Janson, filed on May 15, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to managing telecommunications and more particularly to a mechanism for shaping traffic.

BACKGROUND

Conventionally, telecommunications and network infrastructure providers have relied on often decades old switching technology to providing routing for network traffic. Businesses and consumers, however, are driving industry transformation by demanding new converged voice, data and video services. The ability to meet these demands often can be limited by existing IT and network infrastructures that are closed, proprietary and too rigid to support these next generation services. As a result, telecommunications companies are transitioning from traditional, circuit-switched Public Switched Telephone Networks (PSTN), the common wired telephone system used around the world to connect any one telephone to another telephone, to Voice Over Internet Protocol (VoIP) networks. VoIP technologies enable voice communication over "vanilla" EP networks, such as the public Internet. Additionally, a steady decline in voice revenues has resulted in heightened competitive pressures as carriers vie to grow data/service revenues and reduce churn through the delivery of these more sophisticated data services. Increased federal regulation, security and privacy issues, as well as newly emerging standards can further compound the pressure.

However, delivering these more sophisticated data services has proved to be more difficult than first imagined. Existing IT and network infrastructures, closed proprietary network-based switching fabrics and the like have proved to be too complex and too rigid to allow the creation and deployment of new service offerings.

DETAILED DESCRIPTION

Figure 1A:
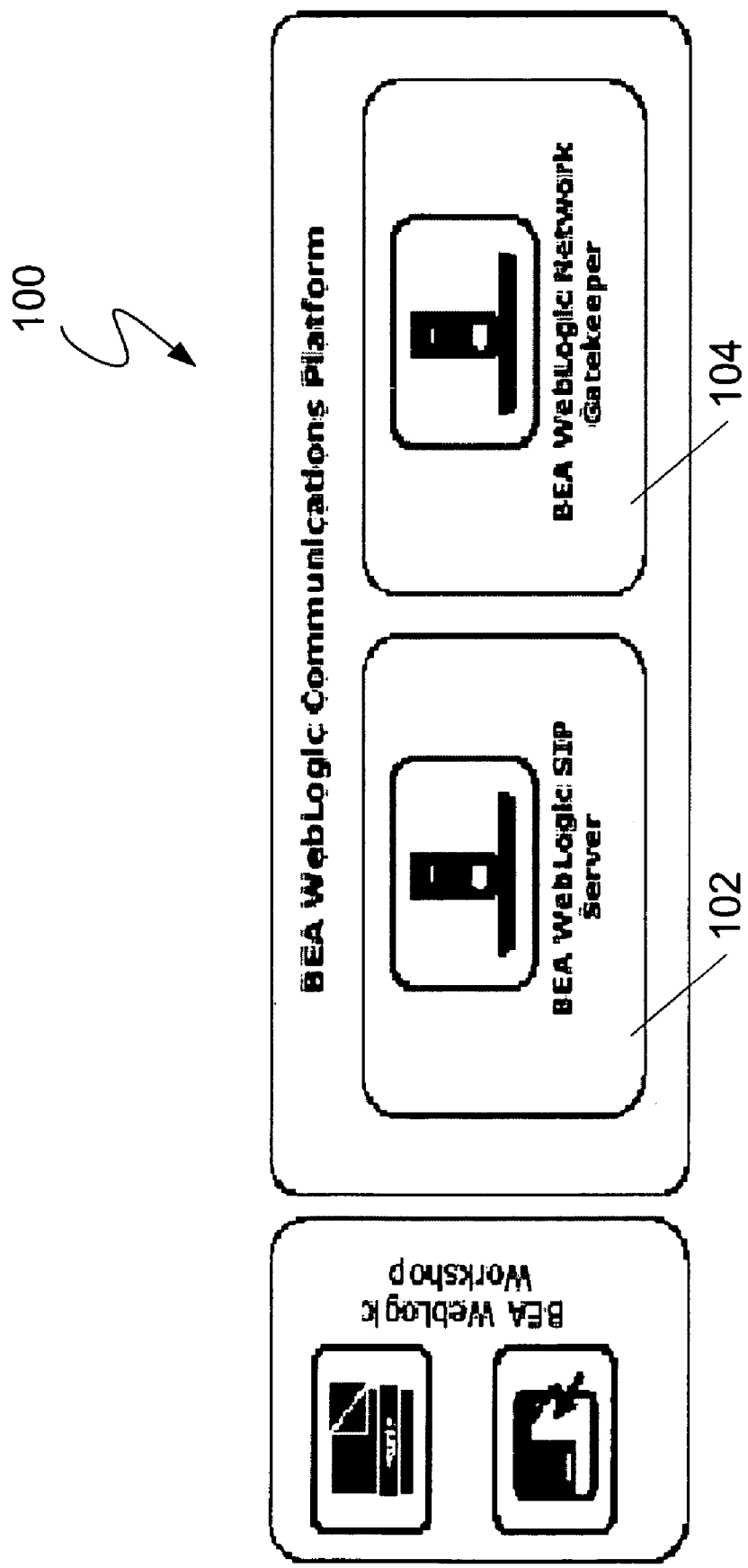
FIGS. 1A-1B are illustrations of an example communications platform that can be used to control access to legacy push protocols based upon a policy in an embodiment.

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for shaping traffic. These mechanisms and methods for shaping traffic can enable embodiments to control traffic flow at a network gatekeeper based upon policies implementing service level agreements dictating traffic characteristics permitted to applications and/or by network node. The ability of embodiments to provide service level agreement based control of network traffic can enable control of traffic flow by application and/or by network node.

In an embodiment and by way of example, a system is provided. The system embodiment includes a policy engine to assign a priority to each one of a plurality of service requests received from one or more applications. The priority selected based upon a service level agreement (SLA). A manager schedules each one of the plurality of service requests between a plurality of sub-queues and at a priority level corresponding to the priority assigned to each service request. A dispatcher randomly assigns each one of a plurality of read operations between the plurality of sub-queues, weighted by bandwidth fraction of each priority level, to select a queue from which to de-queue.

As used herein, the terms service and web service are used interchangeably and are intended to be broadly construed to include any application, program or process resident on one or more computing devices capable of providing services to a requestor or other recipient, including without limitation network based applications, web based server resident applications, web portals, search engines, photographic, audio or video information storage applications, e-Commerce applications, backup or other storage applications, sales/revenue planning, marketing, forecasting, accounting, inventory management applications and other business applications and other contemplated computer implemented services. As used herein, the term application broadly includes any data entry, update, query or program that processes data on behalf of a user. Users may be human or computational entities.

As used herein, the term web services protocol is defined as a communications protocol that can be used for providing services between two or more applications over a network. Typical web services protocols include without limitation Short Message Peer-to-Peer protocol (SMPP) protocol, Push Application Protocol (PAP) protocol, Multimedia Messaging Services (MM7) protocol and Internet Message Access Protocol (IMAP) protocol. As used herein, the term legacy protocol is defined as a communications protocol implemented by existing applications or telecommunications systems. As used herein, the term policy is defined as a computational object including information for enforcing a limitation, a decision or otherwise causing a control point to take some action or refrain from taking some action to shape traffic. As used herein, the term shaping traffic is defined to mean maintaining or altering at least one of an amount, a rate, a bandwidth or any other characteristic of information flow over a channel.

FIG. 1A is an illustration of an example communications platform that can be used to shaping traffic in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

A SIP server 102 and a network gatekeeper 104 comprise a portfolio of product collectively comprise a communications platform 100. The SIP server 102 provides the communications platform 100 with a subsystem in which application components that interact with SIP-based networks may be deployed. The network gatekeeper 104 provides a policy-driven telecommunications Web services gateway that allows granular control over access to network resources from un-trusted domains.

Figure 1B:
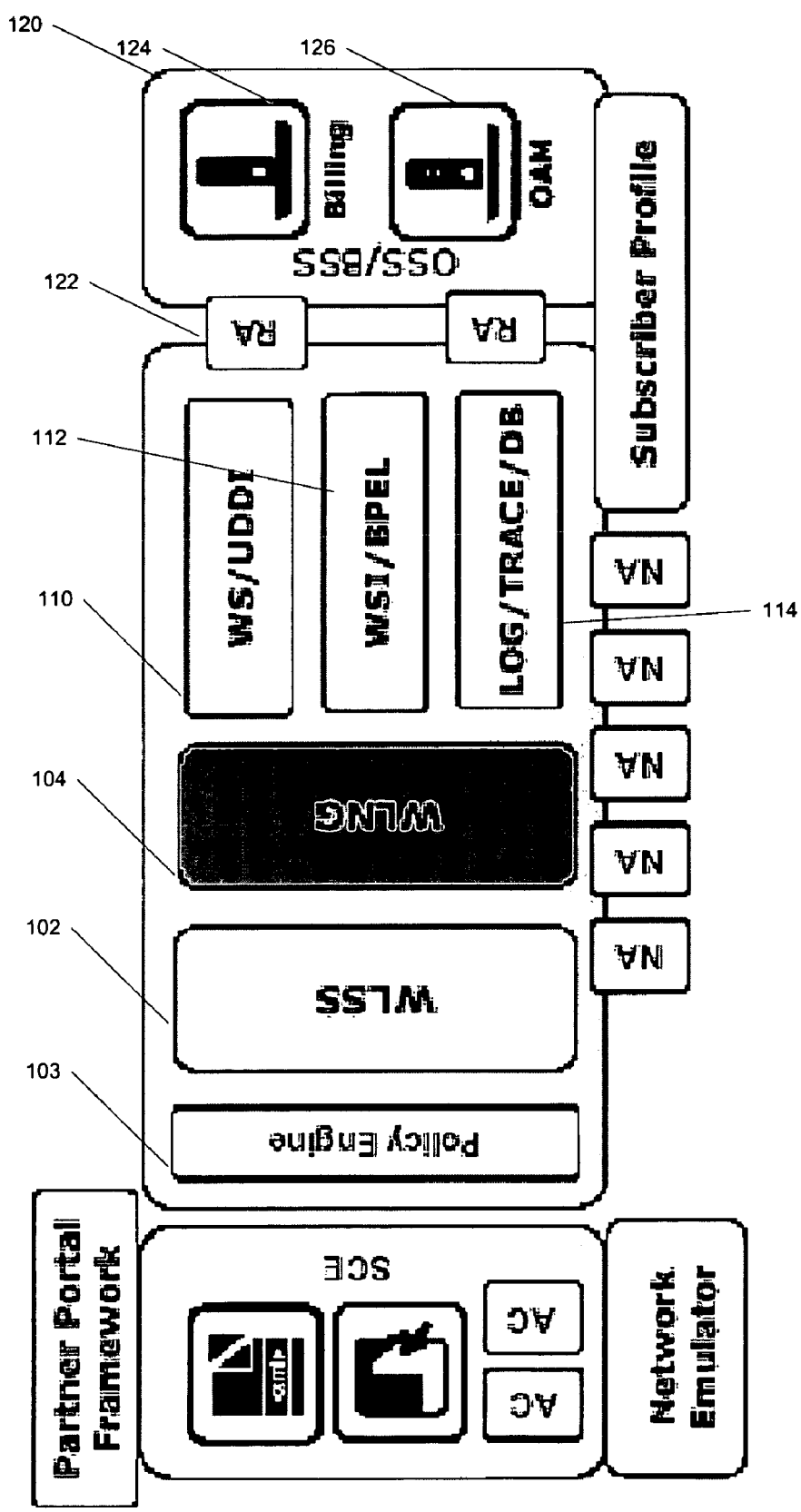

A variety of shared and re-usable software and service infrastructure components comprise the communications platform 100. For example, an application server, such as the WebLogic™ Application Server by BEA Systems, Inc. of San Jose, Calif. This application server may be augmented and adapted for deployment in telecommunications networks, while providing many features and functionality of the WebLogic™ Server counterpart widely deployed in enterprise computing environments. Application server embodiments for use in the telecommunications applications can provide a variety of additional features and functionality, such as without limitation:

Optimized for Peak Throughput
Clustering for Scalability and High-Performance
Generalized for wide range of target platforms (HW/OS) support
Extensive deployment configuration options
Optimized for local management
Plug and play Enterprise Information Systems (EIS) support
Analogously, communications platform embodiments can provide a variety of additional features and functionality, such as without limitation:
Highly Deterministic Runtime Environment
Clustering for High-Availability (HA) and Scalability
Optimized for Telecom HW/OS/HAM W platforms support (SAF, ATCA, HA M/W, etc.)
Hardened configuration
Optimized for Telecom NMS integration
Telecommunications network connectors and interfaces FIG. 1B is another illustration of an example communications platform that can be used to shaping traffic in an embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Communications platform 100 comprises a Session Initiation Protocol (SIP) Server (WLSS) 102 and a Network Gatekeeper (WLNG) 104. Tools for interacting with Web Services, such as a Web Service—Universal Description Discovery Interface (WS/UDDI) 110, a Web Service—Business Process Execution Language (WS/BPEL) 112 may be coupled to the SIP Server 102 and the Network Gatekeeper 104 in embodiments. A log/trace and database 114 can assist with troubleshooting. In some deployments, the communications platform 100 can interface with processes that monitor underlying network function, such as Operations Support Systems/Business Support Systems (OSS/BSS) system 120 via RA protocol adapters 122. (RA protocol is a protocol for submission of billing information that are maintained in the network gatekeeper 104 and sent to a carrier's existing billing infrastructure.) Embodiments can include one or more of the following services OSS/BSS services. For example and without limitation, Operations Support Systems services can include activation, service assurance, usage/metering and provisioning, including designing, assigning and inventory. Business Support Systems can include billing, including invoicing, rating, taxation, and collections 124, customer management, including order entry, customer self services, customer care, trouble ticketing, and customer relationship management. Such interfaces can provide access to Operation, Administration, and Maintenance (OAM) applications 126 and others. A policy engine 103 controls access by one or more third party services (not shown) and services (not shown) to resource elements (not shown) in a network layer.

A Service Creation Environment (SCE) enables service providers to create applications using a higher level programming abstraction tool to expedite application creation. Other types of tools may be provided in embodiments to enable internal staff who are not necessarily software engineers (e.g. business analysts, IT/MIS staff) but are programmers or have programming skills (e.g. internal software engineers with knowledge of the carrier's network etc. but perhaps less savvy as high power J2EE software engineers) to be able to create or modify applications.

A communications platform embodiment can provide an open, high performance, software based fault-tolerant platform that allows operators to maximize revenue potential by shortening time to market and significantly reducing per-service implementation and integration cost and complexity. The communications platform is suitable for use by for network infrastructure vendors, network operators and communications service providers in multiple deployment scenarios ranging from fully IP multi-media subsystem (IMS) oriented network architectures to hybrid and highly heterogeneous network architectures. It is not restricted to use only in carrier networks, however, and may be deployed in Enterprise communications networks without restriction or extensive customization. When deployed in conjunction with an IP multimedia subsystem, the communications platform can serve in the role of an IMS SIP application server and offers communications service providers an execution environment in which to host applications (such as the WebLogic™ Network Gatekeeper), components and standard service enablers. The following diagrams illustrate example network gatekeeper embodiments in telecommunications systems.

Figure 2A:
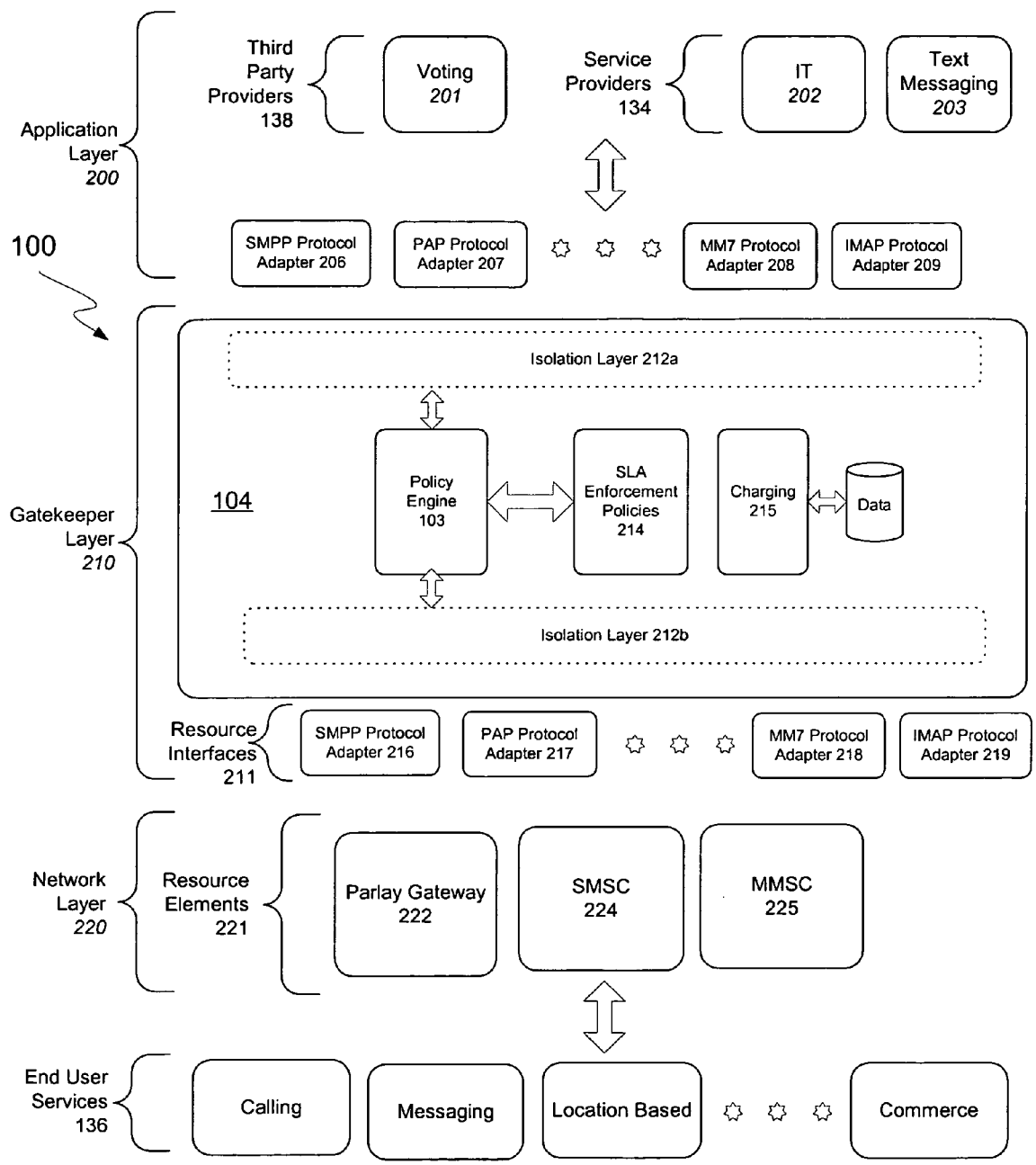
FIGS. 2A-2B are illustrations of example functional aspects of a communications platform embodiment.

FIG. 2A in an illustration of example functional aspects of a communications platform embodiment. Although this diagram depicts components as logically separate, such depiction is merely for illustrative purposes. It will be apparent to those skilled in the art that the components portrayed in this figure can be arbitrarily combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated by FIG. 2A and by way of example, an embodiment of a communications platform 100 provides an easy to use, integrated, configuration-driven intermediary between service providers 134, third party service providers 138 and end users 136. The communications platform 100 embodiment illustrated by FIG. 2A comprises an application layer 200 with interfaces to applications of the service providers 134 and third party service providers 138 and a network layer 220 to interface with the end users 136 via one or more network resource elements 221. Communications platform 100 further comprises a gatekeeper layer 210 interposed between the application layer 200 and the network layer 220 for managing and controlling information flowing between layers 200 and 220.

At the application layer 200, third party service providers 138 and service providers 134 are provided protocol adapters 206-209 to make services 201-203 available to callers over a network via the gatekeeper layer 210 provided by the communications platform 100. Access to network resource elements 221 by services 201, 202, 203 may be achieved using one or more web services protocol adapters 206-209. The protocol adapters 206-209 provide an interface mechanism, enabling the network gatekeeper 104 to intercept protocol communications from services 201-203 and control access to network resource elements by the services 201-203 in accordance with one or more policies. While illustrated here with reference to an embodiment having adapters to specific protocols, including without limitation, a Short Message Peer-to-Peer protocol (SMPP) protocol adapter 206, a Push Application Protocol (PAP) protocol adapter 207, a Multimedia Messaging Services (MM7) protocol adapter 208 and an Internet Message Access Protocol (IMAP) protocol adapter 209, embodiments may include any number or kind of protocols and are neither limited to, nor required to possess, these illustrated protocol adapters.

The gatekeeper layer 210 includes a gatekeeper 104 that comprises a plurality of functional elements working in concert to control access to network resource elements 221 at the network layer 220 by services 201-203 according to one or more policies. In an embodiment, a service level agreement (SLA) 214 comprises one or more policies governing access to the network layer 220. A policy engine 103 provides enforcement of the service level agreements. Service level agreements specify, e.g., how many messages customer A sends an hour, and if over a contract limit, customer A starts paying more, and so forth. In one embodiment, capabilities to create, customize, and execute service level agreement provisions as policies are provided. A charging mechanism 215 determines charges to callers for making a call using network resource elements 221, e.g., determine charges for network traffic (i.e., calls) according to charging information payment amount/schedule, priorities, and the like. Charging mechanism 215 may access data including Call Data Records (CDR) and/or Event Data Records (EDR) in order to determine charges. In one embodiment, the charging mechanism 215 determines an allocation of charges to be apportioned to the third party providing the service. As shown by the dotted lines in FIG. 2A, the actions of the policy engine 103 and other functional elements of the gatekeeper 104 provide virtual isolation layers 212a, 212b between services 201-203 at the application layer 200 and network resource elements 221 at the network layer 220. The isolation layers 212a, 212b indicate that the gatekeeper layer 210 functional elements can be isolated from, and unaffected by, the particulars of protocols, interfaces and the like used by applications, services and callers communicating using the network via the gatekeeper 104.

The gatekeeper layer 210 may include one or more resource interfaces 211 to interface with legacy protocols 216-218 or other web services protocols 219 as a mechanism to reach callers and end user applications (clients) via the network layer 220. While illustrated here with reference having resource interfaces to specific protocols, including without limitation, an SMPP protocol adapter 216, a PAP protocol adapter 217, an MM7 protocol adapter 218 and an IMAP protocol adapter 219, embodiments may include any number or kind of protocols and are neither limited to, nor required to possess, these illustrated resource interfaces. An extension toolkit (not shown) enables partners to develop resource interfaces for other protocols to include into the gatekeeper layer 210.

Network layer 220 includes one or more resource elements 221 such as without limitation a Parlay (protocol) gateway 222, an IMS (IP multi-media subsystem) 223, an SMSCs (short-message-service-center) 224 and MMSCs (multi-media messaging service center) 225, each of which provides a mechanism for moving information through the network to one or more end user services 136.

Figure 2B:
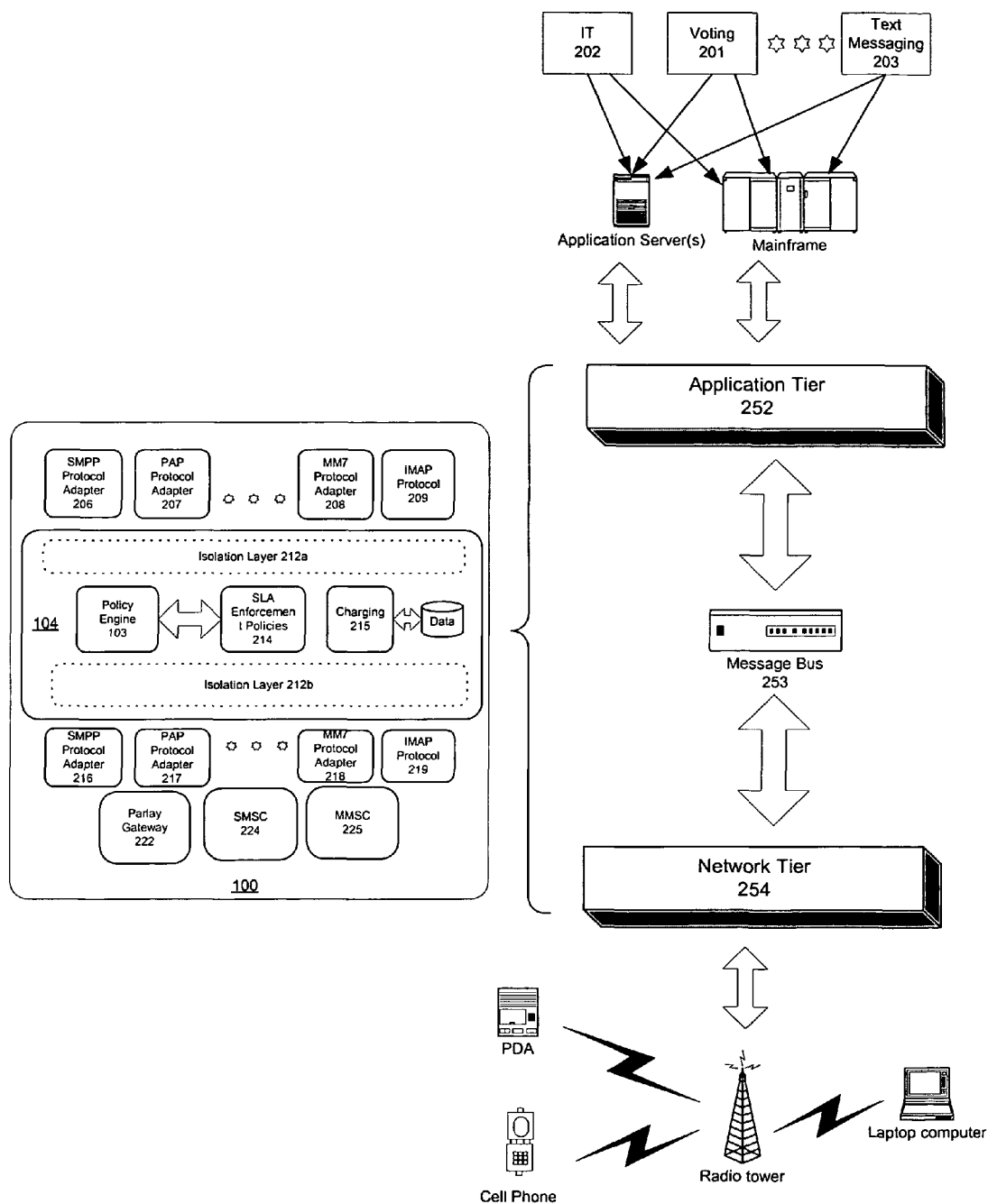

FIG. 2B is functional block diagram that shows a high level overview of an example logical architecture in which techniques for managing services in a communications network may be embodied. By way of example and as illustrated by FIG. 2B, communications platform 100 of FIG. 2A may be implemented using multi-tier system architecture. As shown in FIG. 2B, an example multi-tier system architecture provides independent, coordinated execution of business logic implementing services and the like, executing in one tier, and communications connection management logic which executes in a second tier. An application tier 252 comprises machines capable of executing applications, including applications provided by third parties, on behalf of callers that initiate communications sessions managed by the network tier 254. In an embodiment, an interconnection mechanism 253 provides an interconnection between network elements of application tier 252 and network tier 254. In an example embodiment, interconnection mechanism 253 comprises Java Messaging Service (JMS). In an alternate embodiment, interconnection mechanism 253 is implemented using Common Object Request Broker Architecture (CORBA), a group of application programming interfaces (APIs), communication protocols, and object/service information models to enable heterogeneous applications written in various languages running on various platforms to interoperate.

Figure 3:
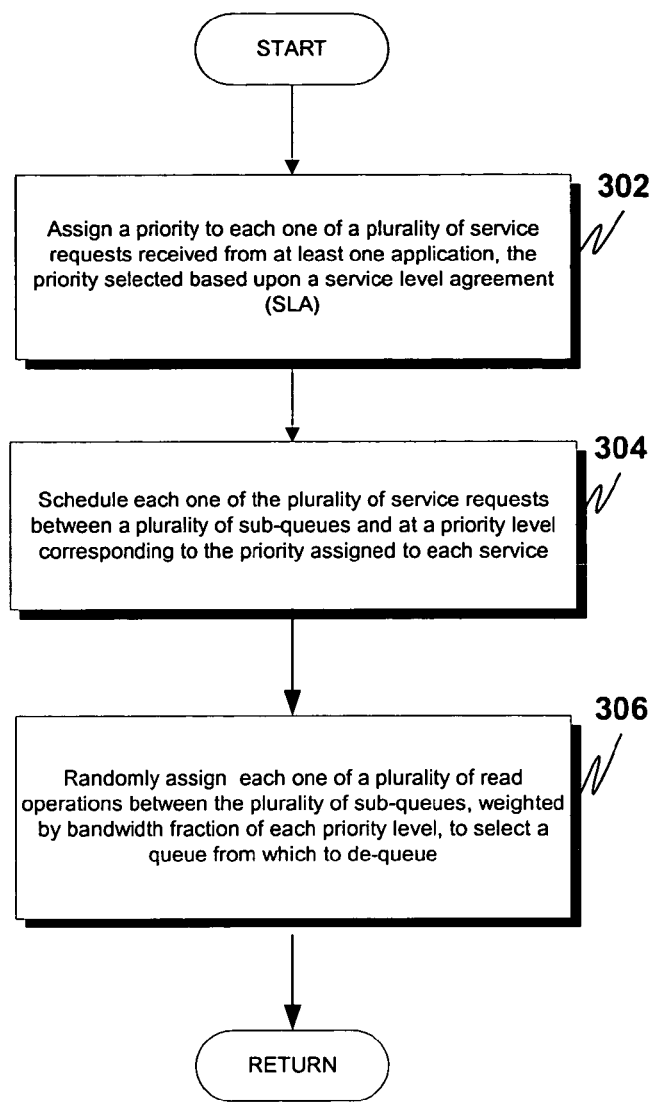
FIG. 3 is an operational flow diagram illustrating a high level overview of a technique for shaping traffic in an embodiment.

FIG. 3 is an operational flow diagram illustrating a high level overview of a technique for shaping traffic in an embodiment. The technique for shaping traffic shown in FIG. 3 is operable with an application provided by a third party provider, such as applications 201 of FIG. 2A and applications provided by service providers, such as applications 202-203 of FIG. 2A, for example. As shown in FIG. 3, a priority is assigned to each one of a plurality of service requests received from at least one application. The priority selected based upon a service level agreement (SLA) (block 302). For example and without limitation, this can include assigning a priority to each one of a plurality of service requests received from at least one application, the priority selected according to a policy implementing a service level agreement (SLA). Then, each one of the plurality of service requests is scheduled between a plurality of sub-queues and at a priority level corresponding to the priority assigned to each service (block 304). By way of example and without limitation, this can include rejecting a service request when the corresponding priority sub-queue is determined to be full. Each one of a plurality of read operations is assigned randomly between the plurality of sub-queues, weighted by bandwidth fraction of each priority level, to select a queue from which to de-queue (block 306). In embodiments, an attempt to de-queue from a highest priority queue first and then to queues of lesser priority will be made when the selected queue is empty for example.

The techniques described above with reference to FIG. 3 will now be described with reference to an example embodiment that employs counters to measure traffic through the gatekeeper system. In an example embodiment, traffic counters are provided for one or more of: global node traffic for a service capability; application traffic for a service capability and application traffic for a service capability and node id. The application traffic limits are specified in a Service Level Agreement (SLA) for the application. The global node limit is specified in the global node SLA. Traffic for a certain application can be assigned a priority in the SLA. Traffic can be rejected in policy enforcement point if a specific Application has submitted requests faster than its limit. The service capability enforces overall traffic levels per application and sets traffic priority according to SLA specified limits. On node level, the plug-in manager enforces specific node limits for each application set in the application level node SLA, and global node restrictions set in the node contracts in the global node SLA.

Figure 4:
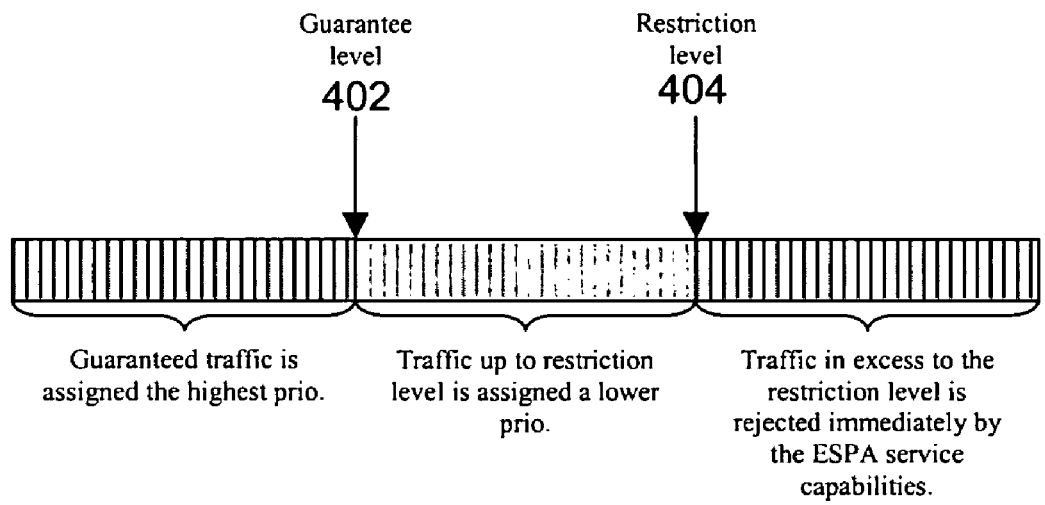
FIG. 4 is an illustration of functional aspects of a traffic prioritization technique in an embodiment.

FIG. 4 is an illustration of functional aspects of an example application traffic prioritization technique for a service capability in an embodiment. In the embodiment illustrated by FIG. 4, each application has a service contract for each service capability type (messaging, location, status etc). Each service contract specifies two traffic levels, a guaranteed traffic level 402 and a restriction traffic level 404. Traffic level priority assignments are configurable in the SLA. Each traffic level is assigned a priority under the Service Level Agreement. Traffic up to the guaranteed level is assigned high priority, and traffic from guarantee level up to restriction level is assigned low priority.

In an embodiment, the guarantee and restriction levels may be assigned with a five-step priority level. This way, different services/service providers can have different priorities for their prioritized and non-prioritized traffic. It is noteworthy that if the guarantee level is really used as a guarantee to an application, the highest possible value should be assigned for all applications. Otherwise, the guaranteed traffic for certain value-added service providers (VASPs) will actually have a lower priority compared to guaranteed traffic for other applications.

In an embodiment, a technique for an application traffic for a service type and network node id includes a counter that is compared to the value specified in the value-added service providers (VASPs) level node SLA.

Figure 5:
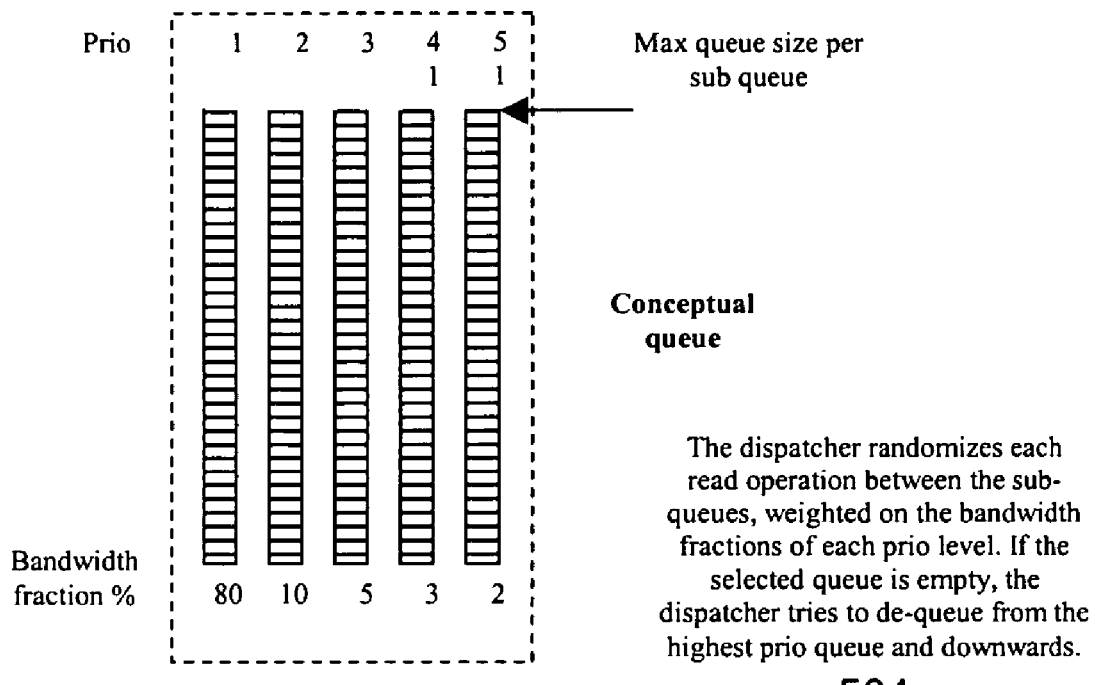
FIG. 5 is an illustration of functional aspects of a priority queuing technique in an embodiment.
Figure 5:

FIG. 5 is an illustration of functional aspects of a global network node id traffic for a service capability technique in an embodiment. The level check illustrated by FIG. 5 may be applied after the application and application/node level techniques, discussed above with reference to FIG. 4, are applied.

To understand how the node level restrictions are enforced, the routing concept will next be described with reference to an example embodiment. The network gatekeeper 104 is connected to network nodes through network plug-in resource elements 221. There is typically a plurality of plug-in resource elements 221 connected to the same network node at the same time since the network gatekeeper 104 is a distributed system that works in active-active mode. Each plug-in resource element 221 serves a specific traffic type (SMS, MMS, user location etc) and is assigned a certain node ID. If several plug-in resource elements 221 are connected to the same network node, they will have the same node ID. This node ID is the base of the node contracts in the node SLA's (i.e. there is one node contract for each node ID). In an embodiment, an OAM procedure, Plugin_manager→setResourceNodeId, may be used to prepare this configuration. Multiple plug-in resource elements 221 can have the same node id (e.g. two CIMD plugins connected to the same SMSC).

A plug-in manager enforces the network node level restrictions in two steps: a scheduling step and a dispatching step. The scheduling step is entered when a service request has been approved and prioritized according to the service capability level. The plug-in manager 502 schedules the service request. The plug-in manager will then first determine the set of possible plug-in network elements 221 for this request, based on the service type (SMS, user location etc), address plan, and plug-in load level. The available plug-in network elements 221 are then passed to the policy rule enforcing the network gatekeeper functionality. This rule will first determine the node ID of each plug-in and then compare the current load onto each node with the restrictions in the global node contract, and the node contract of the VASP. If the outcome of any of these checks is that load levels for the node have been exceeded, the corresponding plug-in network element 221 is removed from a list of available plug-in network elements 221. Finally, the plug-in manager will select a plug-in network element 221 from the remaining ones on the list based on a round robin selection scheme.

In the dispatching step, a dispatcher 504 randomizes each read operation between sub-queues, weighted on the bandwidth fractions of each priority level. If the selected queue is empty, the dispatcher tries to de-queue from the highest priority queue and downwards.

In an embodiment illustrated by FIG. 5, each plug-in network element 221 has a set of priority queues, one for each priority level. If the sub-queue corresponding to the given priority is full, a request is rejected since the system is then handling more traffic of the specific priority than it is dimensioned to handle. The priority queues have a size that is configurable by a plug-in network element manager. When tuning that queue size, users consider the amount of traffic that fits in the queue that is lost from the dispatching process if the server that handles that queue is shut down abruptly. The plug-in network element manager (plug-in network element manager and a priority task manager) is also configured with a percentage bandwidth distribution between the queues to configure how they share the total network node bandwidth.

The priority task manager dispatches entries from the priority queues at the highest possible rate, but the priority task manager that routes data to plug-in network elements 221 connected to the same network and referenced by the same node ID; and will synchronize their current distribution rate through a global node counter. Once a maximum rate per second specified in the global node contract for that node is reached, the dispatchers will stop dispatching until the node counter has been reset (i.e. a new second has been entered).

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for shaping traffic as discussed herein.

Various embodiments may be implemented using a conventional general purpose or specialized digital computer(s) and/or processor(s) programmed according to the teachings of the present disclosure, as can be apparent to those skilled in the computer art. Appropriate software coding can readily be prepared by skilled programmers based on the teachings of the present disclosure, as can be apparent to those skilled in the software art. The invention may also be implemented by the preparation of integrated circuits and/or by interconnecting an appropriate network of conventional component circuits, as can be readily apparent to those skilled in the art.

Embodiments can provide, by way of example and without limitation, services such as:

VoIP services, including, without limitation the following features:

Basic features. These include standards services such as Voice mail, Caller ID, Call waiting, and call forwarding (the ability to forward a call to a different number).

Advanced features. The list of advanced features is operators specific. Following is a brief list of advanced features:

Call logs: The ability to view calls made over a given period of time online, ability to associate names with phone numbers, integrate call log information to other applications such as IM.

Do not disturb: The ability to specify policies around receiving calls-for example, all calls during office hours to be automatically forwarded to a mobile terminal, all calls during the night to be directed to voice mail etc.

Locate me: This is advanced call forwarding. Rather than have all calls forwarded to a single location (e.g., voice mail) when the caller is busy, Locate me can try multiple terminals in series or in parallel. For example, a user may have two office locations, a mobile, and a pager, and it may make sense to forward a call to both office locations first, then the pager, and then the mobile terminal. Locate me is another example of feature interaction.

Personal conferencing: A user could use an existing application (e.g., IM client) to schedule a Web/audio conference to start at a certain time. Since the IM client already has personal profile information, the conferencing system sends out the Web conference link information either through IM and/or email to the participants. The phone contact information in the profile is used to automatically ring the participants at the time of the conference.

Lifetime number: This is the facility where a single virtual number can travel with a customer wherever they live. Even if they move, the old number continues to work, and reaches them at their new location. This is really the analog of static IP addresses in a phone network.

Speed dial: This is the ability to dramatically expand the list of numbers that can be dialed through short-key and accelerator combinations. This is another example of a converged application, since it's very likely that when a user will set up this information when they work through the call logs on the operator user portal, and the updated information needs to be propagated to the network side in real-time.

Media delivery services, including, without limitation the following features:

Depending on the service level agreement users are willing to sign up to, the quality of media delivered (e.g. # of frames per second) will vary. The policy engine enables segmenting the customer base by revenue potential, and to maximize return on investment made in the network.

Context-sensitive applications including, without limitation the following features:

A typical example here is the need for applications that have a short lifetime, extremely high usage peaks within their lifetime, and immediacy. For example, voting on American Idol during the show or immediately afterwards has proved to be an extremely popular application.

Integrated applications including, without limitation the following features:

The final class of applications is one that combines wireline and wireless terminal usage scenarios. An example of an integrated application is the following: a mobile terminal user is on a conference call on their way to work. When he reaches his office, he enters a special key sequence to transfer the phone call to his office phone. The transfer happens automatically without the user having to dial in the dial-in information again. It's important to note hear that this capability be available without the use of any specific support from the hand-set (a transfer button for example).

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

The invention claimed is:

1. A telecommunications system, comprising:
a gateway that controls access to one or more network resources within a mobile device network, the gateway including a policy engine embodied on a tangible machine-readable non-transitory storage medium and executed by one or more processors, said policy engine assigning a priority to each one of a plurality of service requests received from a particular application the service requests being directed to access the network resources, the priority selected by the policy engine based upon a service level agreement (SLA) according to a number of the service requests previously received from said application to access the network resources within a defined time period,
wherein the policy engine assigns a high priority to the service requests while the number of the service requests received from the application within said time period is under a guaranteed threshold level, and
wherein the policy engine assigns a lower priority to the service requests while the number of said service requests received from the application within said time period is between the guaranteed threshold level and a restriction threshold level, and
wherein when the number of the service requests received from the application within said time period exceeds the restriction threshold level, said service requests are automatically rejected;
wherein the gateway is connected to network nodes in the mobile device network through one or more plug-ins that are assigned a node identifier;
a manager that schedules each one of the plurality of service requests between a plurality of sub-queues at a priority level corresponding to the priority assigned to each service request; and
a dispatcher that randomly assigns each one of a plurality of read operations between the plurality of sub-queues, weighted by bandwidth fraction of each priority level, to select a queue from which to de-queue;

wherein the gateway performs network node-level enforcement by determining a node identifier for each plug-in; comparing current load on the node with restrictions in a global node contract of the gateway and with the node contract in the SLA; and if the load levels have been exceeded, removing the plug-in associated with the node identifier from a list of available plug-ins for the service request.

2. The telecommunications system of claim 1, wherein the policy engine assigning a priority to each one of a plurality of service requests received from at least one application further includes:

the policy engine assigning the priority to each one of the plurality of service requests received from the application, the priority selected according to a policy implementing the service level agreement (SLA).

3. The telecommunications system of claim 1, wherein the manager that schedules each one of the plurality of service requests between a plurality of sub-queues at a priority level corresponding to the priority assigned to each service request further includes:

the manager rejecting a service request when the corresponding priority sub-queue is determined to be full.

4. The telecommunications system of claim 1, wherein the dispatcher that randomly assigns each one of a plurality of read operations between the plurality of sub-queues, weighted by bandwidth fraction of each priority level, to select a queue from which to de-queue further includes:

the dispatcher attempting to de-queue from a highest priority queue first and then to queues of lesser priority when the selected queue is empty.

5. The telecommunications system of claim 1, further comprising:

a resource element coupled to the dispatcher to provide a mechanism for moving information through the network to one or more end user services.

6. The telecommunications system of claim 5, wherein the resource element coupled to the dispatcher to provide a mechanism for moving information through the network to one or more end user services includes:

a resource element including at least one of: a Parlay (protocol) gateway, an IMS (IP multi-media subsystem), an SMSCs (short-message-service-center) and an MMSCs (multi-media messaging service center).

7. A method for shaping traffic in a telecommunications environment, the method comprising:

assigning a priority to each one of a plurality of service requests received from a particular application to a gateway that controls access to one or more network resources within a mobile device network, the priority selected based upon a service level agreement (SLA) according to a number of service requests previously received from said application to access the network resources within a defined time period, wherein a high priority is assigned to the service requests while the number of the service requests received from the application within said time period is under a guaranteed threshold level, and wherein a lower priority is assigned to the service requests while the number of said service requests received from the application within said time period is between the guaranteed threshold level and a restriction threshold level, and wherein when the number of the service requests received from the application within said time period exceeds the restriction threshold level, said service requests are automatically rejected;

wherein the gateway is connected to network nodes in the mobile device network through one or more plug-ins that are assigned a node identifier;

scheduling each one of the plurality of service requests between a plurality of sub-queues and at a priority level corresponding to the priority assigned to each service;

assigning randomly each one of a plurality of read operations between the plurality of sub-queues, weighted by bandwidth fraction of each priority level, to select a queue from which to de-queue; and performing network node-level enforcement by determining a node identifier for each plug-in in the gateway; comparing current load on the node with restrictions in a global node contract of the gateway and with the node contract in the SLA; and if the load levels have been exceeded, removing the plug-in associated with the node identifier from a list of available plug-ins for the service request.

8. The method of claim 7, wherein assigning a priority to each one of a plurality of service requests received from at least one application further includes:

assigning the priority to each one of the plurality of service requests received from the application, the priority selected according to a policy implementing the service level agreement (SLA).

9. The method of claim 7, wherein scheduling each one of the plurality of service requests between a plurality of sub-queues and at a priority level corresponding to the priority assigned to each service includes:

rejecting a service request when the corresponding priority sub-queue is determined to be full.

10. The method of claim 7, wherein assigning randomly each one of a plurality of read operations between the plurality of sub-queues, weighted by bandwidth fraction of each priority level, to select a queue from which to de-queue includes:

attempting to de-queue from a highest priority queue first and then to queues of lesser priority when the selected queue is empty.

11. The method of claim 7, further comprising:

moving information through a network to one or more end user services after dequeue.

12. An apparatus for shaping traffic in a telecommunications system, the apparatus comprising:

a processor; and one or more stored sequences of instructions which, when executed by the processor, cause the processor to carry out the steps of:

assigning a priority to each one of a plurality of service requests received from a particular application to a gateway that controls access to one or more network resources within a mobile device network, the priority selected based upon a service level agreement (SLA) according to a number of service requests previously received from said application to access the network resources within a defined time period, wherein a high priority is assigned to the service requests while the number of the service requests received from the application within said time period is under a guaranteed threshold level, and wherein a lower priority is assigned to the service requests while the number of said service requests received from the application within said time period is between the guaranteed threshold level and a restriction threshold level, and wherein when the number of the service requests received from the application within said time period exceeds the restriction threshold level, said service requests are automatically rejected;

wherein the gateway is connected to network nodes in the mobile device network through one or more plug-ins that are assigned a node identifier;

scheduling each one of the plurality of service requests between a plurality of sub-queues and at a priority level corresponding to the priority assigned to each service;

assigning randomly each one of a plurality of read operations between the plurality of sub-queues, weighted by bandwidth fraction of each priority level, to select a queue from which to de-queue; and performing network node-level enforcement by determining a node identifier for each plug-in in the gateway; comparing current load on the node with restrictions in a global node contract of the gateway and with the node contract in the SLA; and if the load levels have been exceeded, removing the plug-in associated with the node identifier from a list of available plug-ins for the service request.

13. The telecommunication system of claim 1, further comprising:

a priority task manager that synchronizes current distribution to a network node from the plurality of sub-queues by way of a global counter, such that once a maximum rate for the network node is reached, the dispatcher stops dispatching until the counter has been reset.

14. The telecommunication system of claim 13, wherein node level restrictions are enforced on each network node in a cluster.

15. The telecommunications system of claim 1, wherein traffic counters are employed for one or more of: global node traffic for a service capability; application traffic for a service capability; and application traffic for a service capability and node identifier.

* * * * *

UNITED STATES PATENT AND TRADEMARK OFFICE
CERTIFICATE OF CORRECTION

PATENT NO.         : 7,788,386 B2
APPLICATION NO.    : 11/432934
DATED              : August 31, 2010
INVENTOR(S)        : Jan Thomas Svensson It is certified that error appears in the above-identified patent and that said Letters Patent is hereby corrected as shown below:

In column 1, line 55, delete "Janson," and insert -- Jansson, --, therefor.

In column 1, line 60, delete "Janson," and insert -- Jansson, --, therefor.

In column 2, line 28, delete "EP" and insert -- IP --, therefor.

In column 1, line 31, delete "chum" and insert -- churn --, therefor.

Signed and Sealed this
Twenty-sixth Day of July, 2011

David J. Kappos
*Director of the United States Patent and Trademark Office*